United States Patent
Kuma et al.

(10) Patent No.: US 8,772,441 B2
(45) Date of Patent: Jul. 8, 2014

(54) POLYURETHANES POLYMERIZABLE COMPOSITION AND METHOD FOR PRODUCING OPTICAL RESIN OF THE SAME

(75) Inventors: Shigetoshi Kuma, Omuta (JP); Koichi Tokunaga, Omuta (JP); Hiroyuki Morijiri, Omuta (JP); Seiichi Kobayashi, Omuta (JP)

(73) Assignee: Mitsui Chemicals, Inc., Minato-ku, Tokyo (JP)

( * ) Notice: Subject to any disclaimer, the term of this patent is extended or adjusted under 35 U.S.C. 154(b) by 1360 days.

(21) Appl. No.: 10/592,375

(22) PCT Filed: Feb. 22, 2005

(86) PCT No.: PCT/JP2005/002762
§ 371 (c)(1),
(2), (4) Date: Sep. 11, 2006

(87) PCT Pub. No.: WO2005/087829
PCT Pub. Date: Sep. 22, 2005

(65) Prior Publication Data
US 2007/0203318 A1    Aug. 30, 2007

(30) Foreign Application Priority Data
Mar. 12, 2004  (JP) ................. 2004-070948

(51) Int. Cl.
    C08G 75/04    (2006.01)
    C08G 18/00    (2006.01)
(52) U.S. Cl.
    USPC ............ 528/375; 528/373; 528/374; 528/73; 528/85; 568/61; 568/66; 351/159
(58) Field of Classification Search
    USPC .......... 528/76, 373, 374, 375, 73, 85; 568/61, 568/66; 351/159
    See application file for complete search history.

(56) References Cited

U.S. PATENT DOCUMENTS

| | | | |
|---|---|---|---|
| 5,059,673 A | 10/1991 | Kanemura et al. | |
| 5,326,501 A | 7/1994 | Ohkubo et al. | |
| 5,403,938 A | 4/1995 | Ohkubo et al. | |
| 5,446,173 A * | 8/1995 | Kanesaki et al. | 549/13 |
| 5,608,115 A * | 3/1997 | Okazaki et al. | 568/61 |
| 5,679,756 A | 10/1997 | Zhu et al. | |
| 6,187,844 B1 * | 2/2001 | Murata | 524/91 |
| 6,274,694 B1 * | 8/2001 | Kosaka et al. | 528/58 |
| 7,132,495 B2 * | 11/2006 | Haseyama et al. | 528/74 |
| 2006/0149018 A1 | 7/2006 | Kitahara | |

FOREIGN PATENT DOCUMENTS

| | | | |
|---|---|---|---|
| EP | 0 422 836 A2 | 4/1991 | |
| EP | 0 665 219 A1 | 8/1995 | |
| EP | 1 637 553 A1 | 3/2006 | |
| GB | 2 313 839 A | 12/1997 | |
| JP | 02-270859 | 11/1990 | |
| JP | 03-124722 | 5/1991 | |
| JP | 3-236386 A | 10/1991 | |
| JP | 06-016657 | 1/1994 | |
| JP | 07-252207 | 10/1995 | |
| JP | 07-286027 | 10/1995 | |
| JP | 07-324118 | 12/1995 | |
| JP | 08-208794 | 8/1996 | |
| JP | 09-110956 | 4/1997 | |
| JP | 09-184901 | 7/1997 | |
| JP | 2003-160631 | 6/2003 | |

OTHER PUBLICATIONS

Supplementary Search Report from European Patent Office issued in Applicant's corresponding European Patent Application No. 05710493.7 dated Jul. 15, 2010.
Office Action from European Patent Office issued in corresponding European Patent Application No. 05 710 493.7 dated Mar. 8, 2011.

* cited by examiner

*Primary Examiner* — Michael L Leonard
(74) *Attorney, Agent, or Firm* — Buchanan, Ingersoll & Rooney PC

(57) ABSTRACT

A resin composition for an optical material that has excellent balance of refractive index of resin, Abbe number, heat resistance, specific gravity, and resin strength, a resin obtained by curing the resin composition, and an optical material are provided.
A polymerizable composition comprising the following is used:
An alicyclic isocyanate compound represented by the formula (1) and/or the formula (2):

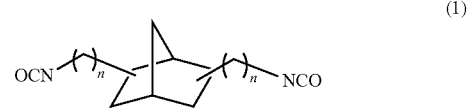

(1)

(In the formula (1), n represents integer of 0 to 3)

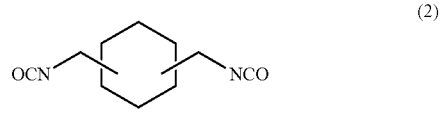

(2)

and
(a) at least one compound of the polythiol compound having at least two thiol groups in one molecule and/or the polythiol compound having at least two thiol groups and at least one (poly)sulfide bond other than the thiol group in one molecule, and
(b) at least one compound of the polyhydroxy compound having at least two hydroxy groups in one molecule and/or the (poly)hydroxy(poly)mercapto compound having at least one hydroxy group and at least one thiol group.

6 Claims, No Drawings

POLYURETHANES POLYMERIZABLE COMPOSITION AND METHOD FOR PRODUCING OPTICAL RESIN OF THE SAME

TECHNICAL FIELD

The present invention relates to a polyurethane lens having good optical properties and resin strength.

BACKGROUND ART

Plastic lenses are lighter, less in cracking and tintable in comparison with inorganic lenses. Therefore, in recent years, the application of plastic lenses to optical elements such as spectacle lenses and camera lenses has increased rapidly.

For this reason, the resin for plastic lenses having improved performance is desired. Further, the resin for plastic lenses having higher refractive index, higher Abbe number, lower specific gravity and higher heat resistance is desired. Until now, the resin material for various lenses has been developed.

Among them as to the representative examples, the polythiourethane resin having high refractive index by increasing a sulfur contents in thiol, which is used as polythiourethane, is developed (See Patent Documents 1 and 2). Among them, the polyurethane resin using alicyclic isocyanate compound represented by the formula (1) and/or the formula (2) (it will be described later) provides plastic lenses having incredibly excellent balance of high Abbe number, high heat resistance (See Patent Document 3).

However, although the above polythiourethane resin is provided with improved high Abbe number, heat resistance, as well as some extent of improved refractive index, higher refractive index is desired. Further, the polythiourethane resin using alicyclic isocyanate compound represented by the formula (1) and/or (2) and the polythiol represented by following formula:

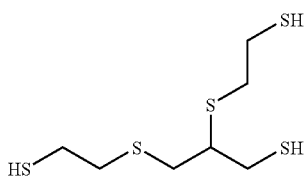

gives high refractive index, Abbe number, and heat resistance (See Patent Document 4).

In the above polythiourethane resin, it has high refractive index, high Abbe number, and high heat resistance. However, if the resin has higher refractive index, the specific gravity tends to be higher and the strength of the resin is insufficient, and during processing of the resin, problem of occurring of cracking or breaking of the resin arises. In this regard, it has a problem that the yield is poor. Further, if heat resistance is lower, the crack is occurred on using after coating treatment. Further, if heat resistance is higher, resin strength tends to be poorer. For these reasons, the resins having a given refractive index, heat resistance, strength, and specific gravity in balanced manner are demanded.

Patent Document 1 Japanese Laid-Open Publication HEI2-270859
Patent Document 2 Japanese Laid-Open Publication HEI7-252207
Patent Document 3 Japanese Laid-Open Publication HEI3-124722
Patent Document 4 Japanese Laid-Open Publication HEI9-110956

DISCLOSURE OF THE INVENTION

Problems to be Solved by the Invention

The problem is that resin strength of the polythiourethane resin as obtained above is still insufficient. Therefore it is an object of the invention to provide a polythiourethane resin having high refractive index, high Abbe number, high heat resistance, low specific gravity and sufficient strength.

Means for Solving the Problems

In order to solve the above problems, the present inventors have proceeded with an extensive investigation. As a result, the inventors have found that the polyurethane lenses obtained by curing a polymerizable composition comprising an alicyclic isocyanate compound represented by the following the formula (1) and/or (2), (a) at least one compound of the polythiol compound having at least two thiol groups in one molecule and/or the polythiol compound having at least two thiol groups and at least one (poly)sulfide bond other than the thiol group in one molecule, and (b) at least one compound of polyhydroxy compound having at least two hydroxy groups in one molecule and/or (poly)hydroxy(poly)mercapto compound having at least one hydroxy group and at least one thiol group in one molecule has a desired physical properties and excellent tintability. Thus the present invention has been achieved.

Namely, the present invention relates to the following [1] to [10]:

[1] A polymerizable composition comprising an alicyclic isocyanate compound represented by the formula (1) and/or (2):

(In the formula (1), n represents an integer of 0 to 3)

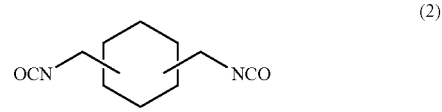

(a) at least one compound of a polythiol compound having at least two thiol groups in one molecule and/or a polythiol compound having at least two thiol groups and at least one (poly)sulfide bond other than the thiol group in one molecule, and (b) at least one compound of a polyhydroxy compound having at least two hydroxy groups in one molecule and/or a(poly)hydroxy(poly)mercapto compound having at least one hydroxy group and at least one thiol group in one molecule.

[2] A polymerizable composition comprising an alicyclic isocyanate compound represented by the formula (3):

(3)

(a) at least one compound of a polythiol compound having at least two thiol groups in one molecule and/or the polythiol compound having at least two thiol groups and at least one (poly)sulfide bond other than the thiol group in one molecule, and
(b) at least one compound of a polyhydroxy compound having at least two hydroxy groups in one molecule and/or a (poly)hydroxy(poly)mercapto compound having at least one hydroxy group and at least one thiol group in one molecule.

[3] The polymerizable composition according to [1] or [2], wherein the polythiol compound having at least two thiol groups in one molecule and/or the polythiol compound having at least two thiol groups and at least one (poly)sulfide bond other than the thiol group in one molecule is at least one polythiol compound selected from
4-mercaptomethyl-1,8-dimercapto-3,6-dithiaoctane,
1,1,3,3-tetrakis(mercaptomethyl)-2-thiapropane,
2,5-bismercaptomethyl-1,4-dithiane,
bis(mercaptoethyl)sulfide,
1,1,3,3-tetrakis(mercaptomethylthio)propane,
2-{2,2-bis(mercaptomethylthio)ethyl}-1,3-dithiethane, and
4,6-bis mercaptomethylthio-1,3-dithiane.

[4] The polymerizable composition according to any one of the [1], [2], and [3], wherein, if the mole number of hydroxy group and thiol group of the polyhydroxy compound having at least two hydroxy groups in one molecule and/or the (poly)hydroxy(poly)mercapto compound having at least one hydroxy group and at least one thiol group in one molecule, are A and B respectively, and the mole number of the thiol group of the polythiol compound having at least two thiol groups and/or the polythiol compound having at least two thiol groups and at least one (poly)sulfide bond other than the thiol group in one molecule, is C, A/(A+B+C) is from 0.1 to 40%.

[5] The polymerizable composition according to any one of the [1] to [4], wherein the polyhydroxy compound having at least two hydroxy groups in one molecule and/or the (poly) hydroxy(poly)mercapto compound having at least one hydroxy group and at least one thiol group in one molecule is at least one (poly)hydroxy group containing compound selected from (poly)hydroxy(poly)mercapto compound, 2-mercaptoethanol, 3-mercapto-1,2-propanediol, pyrogallol, ethylene glycol, polycaprolactondiol, and polyalkyleneoxidepolyol represented by the formula (4):

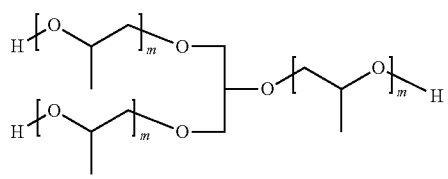

(4)

(wherein, m represents an integer.)

[6] The polymerizable composition according to [1] or [4], wherein an alicyclic isocyanate compound is isocyanate compound described in the formula (1), the polythiol compound having at least two thiol groups in one molecule and/or the polythiol compound having at least two thiol groups and at least one (poly)sulfide bond other than the thiol group in one molecule is 4-mercaptomethyl-1,8-dimercapto-3,6-dithiaoctane, or 4,8-dimercapto methyl-1,11-mercapto-3,6,9-trithiaundecane, the polyhydroxy compound having at least two hydroxy groups in one molecule and/or the (poly)hydroxy (poly)mercapto compound having at least one hydroxy group and at least one thiol group in one molecule is 2-mercaptoethanol.

[7] A process for producing a resin by curing the polymerizable composition according to any one of [1] to [6].

[8] A resin obtained by curing the polymerizable composition according to any one of [1] to [6].

[9] An optical element comprising the resin according to [8].

[10] A lens comprising the optical element according to [9].

Effect of the Invention

According to the present invention, a polyisocyanate compound suitably used as a transparent resin material and a polymerizable composition comprising the compound are discovered. Accordingly, a polythiourethane resin material obtained by curing the compounds may meet a requirement of refractive index, Abbe number, heat resistance and resin strength, and have excellent tintability.

BEST MODE FOR CARRYING OUT THE INVENTION

The process for producing a polyurethane lens of the present invention and polyurethane lens obtained by the process solve the above problems, and it is provided a polyurethane lens which meets a requirement of refractive index of resin, Abbe number, heat resistance, and strength of resin successfully, and has excellent tintability.

The polyurethane lens of the present invention can be produced by mixing the alicyclic isocyanate compound represented by the formula (1) and/or the formula (2), with
(a) at least one compound of the polythiol compound having at least two thiol groups in one molecule and/or the polythiol compound having at least two thiol groups in one molecule and at least one (poly)sulfide bond other than the thiol group in one molecule, and
(b) at least one compound of the polyhydroxy compound having at least two hydroxy groups in one molecule and/or the (poly)hydroxy(poly)mercapto compound having at least one hydroxy group and at least one thiol group in one molecule, and heat curing the mixture.

The alicyclic isocyanate compounds of the present invention include the alicyclic isocyanate compound represented by the formula (1) such as 2,5-bis(isocyanato)bicyclo-[2.2.1]-heptane, 2,6-bis(isocyanato)bicyclo-[2.2.1]-heptane, 2,5-bis(isocyanatomethyl)bicyclo-[2.2.1]-heptane, 2,6-bis(isocyanatomethyl)bicyclo-[2.2.1]-heptane, 2,5-bis(isocyanatoethyl)bicyclo-[2.2.1]-heptane, and 2,6-bis(isocyanatoethyl)bicyclo-[2.2.1]-heptane, but are not limited thereto.

The alicyclic isocyanate compounds represented by the formula (2) include 1,4-bis(isocyanatomethyl)cyclohexane, 1,3-bis(isocyanatomethyl)cyclohexane, and 1,2-bis(isocyanatomethyl)cyclohexane, but are not limited thereto.

The polythiol compounds having at least two thiol groups in one molecule and/or the polythiol compound having at least two thiol groups and at least one (poly)sulfide bond other than the thiol group in one molecule according to the present invention include aliphatic polythiol compounds such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, 1,2-dimercaptopropylmethylether, 2,3-dimercaptopropylmethylether, 2,2-bis(mercaptomethyl)-1,3-propanedithiol, bis(2-mercaptoethyl)ether, tetrakis(mercaptomethyl)methane, or the like;

aliphatic polythiol compounds containing ester bond such as (2-mercaptoethylester)2,3-dimercaptosuccinate, bis(2-mercaptoethylester)thiomalate, 2,3-dimercapto-1-propanol(2-mercaptoacetate), 2,3-dimercapto-1-propanol(3-mercaptopropionate), 3-mercapto-1,2-propanediol di(2-mercaptoacetate), 3-mercapto-1,2-propanediol di(3-mercaptopropionate), diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerine tris(2-mercaptoacetate), glycerine tris(3-mercaptopropionate), 1,4-cyclohexanediol bis(2-mercaptoacetate) and 1,4-cyclohexanediol bis(3-mercaptopropionate), and halogen substituted compound thereof such as chloro substituted compound, bromo substituted compound, or the like;

a polythiol compound comprising benzene ring such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, or the like;

halogen substituted aromatic polythiol compounds such as chloro substituted compounds, bromo substituted compounds, or the like such as 2,5-dichlorobenzene-1,3-dithiol, 1,3-di(p-chlorophenyl)propane-2,2-dithiol, 3,4,5-tribromo-1,2-dimercaptobenzene, 2,3,4,6-tetrachlor-1,5-bis(mercaptomethyl)benzene; and polythiol compounds containing heterocyclic ring such as 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine, or the like and halogen substituted compound thereof such as chloro substituted compound, bromo substituted compound, or the like, but are not limited thereto.

The (poly)thiol compounds having at least two thiol groups in one molecule and at least one (poly)sulfide bond other than the thiol group in one molecule include aliphatic polythiol compounds, such as bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 1,2-bis[(2-mercaptoethyl)thio]-3-mercaptopropane, 5,7-dimercaptomethyl-1,11-mercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithian, 2,5-dimercaptomethyl-2,5-dimethyl-1,4-dithian, or the like, and thioglycolic acid ester and mercaptopropionic acid ester thereof;

hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropinate) hydroxypropyldisulfide bis(2-mercaptoacetate), hydroxypropyldisulfide bis(3-mercaptopropinate) 2-mercaptoethylether bis(2- mercaptoacetate), 2-mercaptoethylether bis(3-mercaptopropionate), and 1,4-dithiane-2,5-diol bis(3-mercaptopropionate);

aliphatic polythiol such as bis(2-mercaptoethylester)thiodiglycolate, bis(2-mercaptoethylester)thiodipropionate, bis(2-mercaptoethylester)4,4-thiodibutyrate, bis(2-mercaptoethylester)dithiodiglycolate, bis(2-mercaptoethylester)dithiodipropionate, bis(2-mercaptoethylester)4,4-dithiodibutyrate, bis(2,3-dimercaptopropylester)thiodiglycolate, bis(2,3-dimercaptopropylester)thiodipropionate, bis(2,3-dimercaptopropylester)dithiodiglycolate, bis(2,3-dimercaptopropylester)thiodipropionate, bis(2,3-dimercaptopropylester)dithiodipropionate, or the like;

heterocyclic compound such as 3,4-thiophenedithiol, bismuthiol, or the like;

1,1,3,3-tetrakis(mercaptomethylthio)propane, 1,1,2,2-tetrakis(mercaptomethylthio)ethane, 4,6-bis(mercaptomethylthio)-1,3-dithiacyclohexane, 1,1,5,5-tetrakis(mercaptomethylthio)-3-thiapentane, 1,1,6,6-tetrakis(mercaptomlethylthio)-3,4-dithiahexane, 2,2-bis(mercaptomethylthio)ethanethiol, 2-(4,5-dimercapto-2-thiapentyl)-1,3-dithiacyclopentane, 2,5-bis(4,4-bis(mercaptomethylthio)-2-thiabutyl)-1,4-dithian, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 3-mercaptomethylthio-1,6-dimercapto-2,5-dithiahexane, 2-(2,2-bis(mercaptodimethylthio)ethyl)-1,3-dithiethane, 1,1,9,9-tetrakis(mercaptomethylthio)-5-(3,3-bis(mercaptomethylthio)-1-thiapropyl)3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabutyl)methane, 3,5,9,11-tetrakis(mercaptomethylthio)-1,13-dimercapto-2,6,8,12-tetrathiatridecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercaptomethylthio)-1,17-dimercapto-2,6,8,10,12,16-hexathiaheptadecane, 3,4,8,9-tetrakis(mercaptomethylthio)-1,11-dimercapto-2,5,7,10-tetrathiaundecane, 3,4,8,9,13,14-hexakis(mercaptomethylthio)-1,16-dimercapto-2,5,7,10,12,15-hexathiahexadecane, 8-[bis(mercaptomethylthio)methyl]-3,4,12,13-tetrakis(mercaptomethylthio)-1,15-dimercapto-2,5,7,9,11,14-hexathiapentadecane, 4,6-bis[3,5-bis(mercaptomethylthio)-7-mercapto-2,6-dithiaheptylthio]-1,3-dithian, 4-[3,5-bis(mercaptomethylthio)-7-mercapto-2,6-dithiaheptylthio]-6-mercaptomethylthio-1,3-dithian, 1,1-bis[4-(6-mercaptomethylthio)-1,3-dithianylthio]-1,3-bis(mercaptomethylthio)propane, 1-[4-(6-mercaptomethylthio)-1,3-dithianylthio]-3-[2,2-bis(mercaptomethylthio)ethyl]-7,9-bis(mercaptomethylthio)-2,4,6,10-tetrathiaundecane, 1,5-bis[4-(6-mercaptomethylthio)-1,3-dithianylthio]-3-[2-(1,3-dithiethanyl)]methyl-2,4-dithiapentane, 4,6-bis{3-[2-(1,3-dithiethanyl)]methyl-5-mercapto-2,4-dithiapentylthio}-1,3-dithian, 4,6-bis[4-(6-mercaptomethylthio)-1,3-dithianylthio]-6-[4-(6-mercaptomethylthio)-1,3-dithianylthio]-1,3-dithian, 3-[2-(1,3-dithiethanyl)]methyl-7,9-bis(mercaptomethylthio)-1,11-dimercapto-2,4,6,10-tetrathiaundecane, 9-[2-(1,3-dithiethanyl)]methyl-3,5,13,15-tetrakis(mercaptomethylthio)-1,17-dimercapto-2,6,8,10,12,16-hexathiaheptadecane, 3-[2-(1,3-dithiethanyl)]methyl-7,9,13,15-tetrakis(mercaptomethylthio)-1,17-dimercapto-2,4,6,10,12,16-hexathiaheptadecane, 3,7-bis[2-(1,3-dithiethanyl)]methyl-1,9-dimercapto-2,4,6,8-tetrathianonane, 4-[3,4,8,9-tetrakis(mercaptomethylthio)-11-mercapto-2,5,7,10-tetrathiaundecyl]-5-mercaptomethylthio-1,3-dithiolan, 4,5-bis[3,4-bis(mercaptomethylthio)-6-mercapto-2,5-dithiahexylthio]-1,3-dithiolan, 4-[3,4-bis(mercaptomethylthio)-6-mercapto-2,5-dithiahexylthio]-5-mercaptomethylthio-1,3-dithiolan, 4-[3-bis(mercaptomethylthio)methyl-5,6-bis(mercaptomethylthio)-8-mercapto-2,4,7-trithiaoctyl]-5-mercaptomethylthio-1,3-dithiolan, 2-{bis[3,4-bis(mercaptomethylthio)-6-mercapto-2,5-dithiahexylthio]methyl}-1,3-dithiethane, 2-[3,4-bis(mercaptomethylthio)-6-mercapto-2,5-dithiahexylthio]mercaptomethylthiomethyl-1,3-dithiethane, 2-[3,4,8,9-tetrakis(mercaptomethylthio)-11-mercapto-2,5,7,10-tetrathiaundecylthio]mercaptomethylthiomethyl-1,3-dithiethane, 2-[3-bis(mercaptomethylthio)methyl-5,6-bis(mercaptomethylthio)-8-mercapto-2,4,7-trithiaoctyl]mercaptomethylthiomethyl-1,3-dithiethane, 4,5-bis{1-[2-(1,3-dithiethanyl)]-3-mercapto-2-thiapropylthio}-1,3-dithiolan, 4-{1-[2-(1,3-dithiethanyl)]-3-mercapto-2-thiapropylthio}-5-[1,2-bis(mercaptomethylthio)-4-mercapto-3-thiabutylthio]-1,3-dithiolan, 2-{bis[4-(5-mercaptomethylthio-1,3-dithiolanyl)thio]methyl}-1,3-dithiethane, 4-[4-(5-mercaptomethylthio-1,3-dithiolanyl)thio]-5-{1-[2-(1,3-dithiethanyl)]-3-mercapto-2-thiapropylthio}-1,3-dithiolan, and their polythiol compounds having dithioacetal or dithioketal skeletons such as their oligomer or the like;

tris(mercaptomethylthio)methane, tris(mercaptoethylthio)methane, 1,1,5,5-tetrakis(mercaptomethylthio)-2,4-dithiapentane, bis[4,4-bis(mercaptomethylthio)-1,3-dithiabutyl]-(mercaptomethylthio)methane, tris[4,4-bis(mercaptomethylthio)-1,3-dithiabutyl]methane, 2,4,6-tris(mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris[(4-mercaptomethyl-2,5-dithiacyclohexyl-1-yl)methylthio]methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacyclopentane, tris[2,2-bis(mercaptomethylthio)-2-thiapropyl]methane, tris[4,4-bis(mercaptomethylthio)-3-thiabutyl]methane, 2,4,6-tris[3,3-bis(mercaptomethylthio)-2-thiapropyl]-1,3,5-trithiacyclohexane, tetrakis[3,3-bis(mercaptomethylthio)-2-thiapropyl]methane, or the like, and compounds having ortho trithioformic ester skeleton such as their oligomer, but are not limited thereto. Furthermore, their halogen substituted compounds such as chloro substituted compounds, bromo substituted compounds or the like can be employed. These compounds may be used individually or two or more compounds may be used in combination.

The polyhydroxy compound having at least two hydroxy groups in one molecule and/or the (poly)hydroxy(poly)mercapto compounds having at least one hydroxy group and at least one thiol group in one molecule may be a compound that has at least two hydroxy groups only, or a compound in which the sum of hydroxy group and thiol group in one molecule is two or more. Specific examples may include compounds containing mercapto groups and hydroxy groups, such as 2-mercaptoethanol, 3-mercapto-1,2-propanediol, glycerinedi(mercaptoacetate), glycerine-1,3-di(3-mercaptopropionate), 1-hydroxy-4-mercaptocyclohexane, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate)dipentaerythritol pentakis(3-mercaptopropionate), 1-hydroxyethylthio-3-mercaptoethylthiobenzene, bis(2-mercaptoacetate) malate, 2,4-dimercaptophenol, hydroxymethyltris (mercaptoethylthiomethyl)methane, 1-hydroxyethylthio-3-mercaptoethylthiobenzene, 4-hydroxy-4'-mercaptodiphenylsulfone, 2-(2-mercaptoethylthio)ethanol, dihydroxyethylsulfidemono(3-mercaptopropionate), dimercaptoethanemono(salicylate), and hydroxyethylthiomethyltris(mercaptoethylthiomethyl)methane.

The compounds having two hydroxy groups include polyols such as ethylene glycol, diethylene glycol, propylene glycol, dipropylene glycol, butylenes glycol, neopentyl glycol, glycerine, trimethylolethane, trimethylolpropane, butanetriol, 1,2-methylglucoside, pentaerythritol, dipentaerythritol, tripentaerythritol, sorbitol, erythritol, treitol, ribitol, arabinitol, xylitol, alytol, mannitol, dulcytol, iditol, glycol, inocytol, hexanetriol, triglycerose, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropylcyclohexanol, tricyclo[5.2.1.0$^{2.6}$]decanediol, bicyclo[4.3.0]nonanedimethanol, tricyclo[5.3.1.1]dodecanediethanol, hydroxypropyltricyclo[5.3.1.1]dodecanol, spiro [3.4]octanediol, butylcyclohexanediol, 1,1-bicyclohexylidenediol, cyclohexanetriol, maltitol, lactitol, dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xyleneglycol, di(2-hydroxyethoxy)benzene, bisphenol A-bis-(2-hydroxyethylether), tetrabromobisphenol A, tetrabromobisphenol A-bis-(2-hydroxyethylether), dibromoneopentyl glycol, epoxy resin, or the like; condensed products of said polyols with organic acids such as oxalic acid, glutamic acid, adipic acid, acetic acid, propionic acid, cyclohexanecarboxylic acid, β-oxocyclohexanepropionic acid, dimeric acid, phthalic acid, isophthalic acid, salicylic acid, 3-bromopropionic acid, 2-bromoglycolic acid, dicarboxy cyclohexane, pyromellitic acid, butane tetracarboxylic acid, bromophthalic acid, or the like; addition products of said polyols with alkyleneoxides such as ethylene oxide, propylene oxide, or the like; addition products of alkylenepolyamines with alkylene oxides such as ethyleneoxide, propyleneoxide, or the like, but are not limited thereto. Furthermore their halogen substituted compounds such as chloro substituted compounds, bromo substituted compounds, or the like may be used.

The compounds having at least two hydroxy groups include polyol compound having (poly)sulfide bond such as bis-[4-(hydroxyethoxy)phenyl]sulfide, bis-[4-(2-hydroxypropoxy)phenyl]sulfide, bis-[4-(2,3-dihydroxypropoxy) phenyl]sulfide, bis-[4-(4-hydroxycyclohexyloxy)]sulfide, bis-[2-methyl-4-(hydroxyethoxy)-6-butylphenyl]sulfide, and ethylene oxide and/or propylene oxide adduct thereof in which, per hydroxy group, average at most 3 molecules of the ethylene oxide and/or propylene oxide are added, di-(2-hydroxyethyl)sulfide, 1,2-bis-(2-hydroxyethylmercapto) ethane, bis(2-hydroxyethyl)disulfide, 1,4-dithian-2,5-diol, bis(2,3-dihydroxypropyl)sulfide, tetrakis(4-hydroxy-2-thiabutyl)methane, bis(4-hydroxyphenyl)sulfone (brand name: bisphenol S), tetrabromobisphenol S, tetramethylbisphenol S, 4,4'-thiobis(6-tert-butyl-3-methylphenol), 1,3-bis(2-hydroxyethylthioethyl)-cyclohexane, or the like, but are not limited thereto. Furthermore their halogen substituted compounds such as chloro substituted compounds, bromo substituted compounds, or the like may be used. These compounds may be used individually or two or more compounds may be used in combination The polyalkyleneoxidepolyol represented by the formula (4) is not specifically limited as long as m is an integer of at least 0, but the range of m is preferably 1 to 30, more preferably 1 to 20, and especially preferablly 1 to 15.

The ratio of the alicyclic isocyanate compounds represented by the formula (1) or (2) to said polythiol and the polyhydroxy compound having at least two hydroxy groups in one molecule and/or the (poly)hydroxy(poly)mercapto compound having at least one hydroxy group and at least one thiol group in one molecule to be used is usually in the range of 0.5 to 3.0 as mole ratio of the functional group NCO/(SH+OH), preferably in the range of 0.5 to 1.5, and especially preferably in the range of 0.8 to 1.2.

Among the compounds described above, the resin obtained by mixing and curing an 2,5-bis(isocyanatomethyl)bicyclo[2,2,1]heptane as an alicyclic isocyanate compound, (a) 4-mercaptomethyl-1,8-dimercapto-3,6-dithiaoctane as at least one compound of the polythiol compound having at least two thiol groups in one molecule and/or the polythiol compound having at least two thiol groups and at least one (poly)sulfide bond other than the thiol group in one molecule, and (b) 2-mercaptoethanol as at least one compound of the polyhydroxy compound having at least two hydroxy groups in one molecule and/or the (poly)hydroxy(poly)mercapto compound having at least one hydroxy group and at least one thiol group in one molecule, especially has high refractive index, high Abbe number, high heat resistance, low specific gravity, and sufficient resin strength in a balanced manner. Further it has excellent tintability. Therefore it brings about desired result.

If the mole number of hydroxy group and thiol group of the polyhydroxy compound having at least two hydroxy groups in one molecule and/or the (poly)hydroxy(poly)mercapto compound having at least one hydroxy group and at least one thiol group in one molecule, are A and B respectively, and the mole number of the thiol group of the polythiol compound having at least two thiol group and/or the polythiol compound having at least two thiol groups and at least one (poly)sulfide bond other than thiol group in one molecule, is C, A/(A+B+C) is preferably from 0.1 to 40%, more preferably from 3.0 to 35%, and particularly preferably from 5.0 to 30%.

The polyurethane lens of the present invention comprises base resin having urethane bond and/or S-alkyl thiocarbamic acid ester bond by reaction of isocyanate group with hydroxy group and/or thiol group. However, according to the purpose, it may additionally have an allophanate bond, a urea bond, or a biuret bond. For example, it may often bring a desirable result if the isocyanate group is further reacted with the urethane bond or S-alkyl thiocarbamic acid ester bond to increase the cross-link density. Such a reaction may be carried out at a high temperature of at least 100° C. and the isocyanate component should be used in excess. Alternatively, an amine compound or the like may additionally be used to produce a urea bond or a biuret bond. As such, in the case of using the compound other than the polyol compound, polythiol compound or the thiol compound having hydroxy group which are reacted with isocyanate compound, attention should be paid to a coloring.

Further, according to the purpose, likewise a known molding method various additives such as a chain extender, a cross-linking agent, a light stabilizer, an ultraviolet absorber, an anti-oxidant, an oil-soluble dye, filler, or the like may be used. In order to obtain the desired reaction rate, a known reaction catalyst useful in the manufacture of a S-alkyl thiocarbamic acid ester or polyurethane can be used suitably. The polyurethane lens of the present invention can be commonly prepared by cast polymerization.

Specifically, the alicyclic isocyanate compounds represented by the formula (1) and/or the formula (2), (a) at least one compound of the polythiol compound having at least two thiol groups in one molecule and/or the polythiol compound having at least two thiol groups and at least one (poly)sulfide bond other than the thiol group in one molecule, and (b) at least one compound of the polyhydroxy compound having at least two hydroxy groups in one molecule and/or the (poly)hydroxy(poly)mercapto compound having at least one hydroxy group and at least one thiol group in one molecule, are mixed. The liquid mixture is degasified if necessary by suitable method, then poured into a mold, followed commonly by gradual heating from lower temperature to higher temperature to polymerize.

The polyurethane lens of the present invention obtained in such manner has the characteristics such as high refractive index and high Abbe number (low dispersibility), excellent heat resistance, excellent durability, and excellent resin strength with light weighting. Therefore, it is suitable for optical element material such as spectacle lens, camera lens, or the like.

The polyurethane lens of the present invention may be subjected to physical or chemical treatment such as surface abrasion treatment, antistatic treatment, hard coat treatment, non-reflective coat treatment, dyeing treatment and polarizing treatment for prevention of reflection, enhancement of hardness, improvement of abrasion resistance, improvement of chemical resistance, prevention of turbidity, supply of fashionability, and the like.

EXAMPLE

Hereinafter, the invention will be further specifically described by the following examples. Among tests of the performance of the resins, refractive index, heat resistance, specific gravity, resin strength, and tintability were evaluated by the following testing method.

Refractive index (ne) and Abbe number (ve): Measured at 20 C. with a Pulfrich refractometer.

Heat resistance: Tg (° C.) of the TMA penetration method (50 g of a load, pinpoint 0.5 mmΦ) is measured as heat resistance.

Resin strength I (three points flexural strength): Using AUTOGRAPH AGS-J manufactured by Shimadzu Corporation, and polyurethane lens test piece processed to a dimension of 3.0 mm of thickness, 70 mm of length and 24.0 mm of width, a load is applied at the center of the lens test piece with 1.2 mm/min of descending speed. Maximum load (N/mm$^2$) at the time of breaking of the lens test piece was measured.

Resin Strength II (Tensile Strength): Using AUTOGRAPH AGS-J manufactured by Shimadzu Corporation, and polyurethane lens test piece processed to a dimension of 3.0 mm of thickness, 50 mm of length and 6.0 mm of width, the lens test piece is pulled from the end-to-end at a pull rate of 1.0 mm/min. Maximum tensile strength (N/mm$^2$) was measured.

Tintability: To pure water, a disperse dye for spectacle lens manufactured by Miike Senryo Ltd, 'LP-Blue' 1.5 g, 'MLP-Yellow' 2.0 g and 'MLP-Red' 1.5 g as the staining agent were added to prepare dye dispersion solution. After heating the solution at 90° C., a plastic lens test piece having 9 mm thicknesses were immersed in the solution for 5 minutes at 90° C., to stain.

Transmittance of the lens test piece after staining was measured at the wavelength of 430 nm, 530 nm, and 570 nm. The basis of evaluation is stated as follows. X represents a transmittance of at least 50%, Δ represents a transmittance of 50 to 30%, ○ represents a transmittance of at most 30%.

Example 1

To 62.2 g of 2,5-bis(isocyanatomethyl)bicyclo[2.2.1]heptane, 0.10 g of dichloride as a curing catalyst, 0.30 g of Zelec UN (acidic phosphoric ester), and 0.05 g of Viosorb 583 (ultraviolet absorbent) were mixed and dissolved at 20° C. By adding 11.9 g of 2-mercaptoethanol, and 25.9 g of 4-mercaptomethyl-1,8-dimercapto-3,6-dithiaoctane, mixed homogeneous solution was prepared. The rate of mole number of hydroxy group was 25.2% with respect to the sum of mole number of hydroxy group and thiol group. This homogeneous solution was degassed under the 600 Pa for 1 hour. After that, the solution was filtered through 1 μm PTFE filter. Then the resulting solution was introduced to a mold equipped with glass mold and tape. This mold was put into the oven, and the temperature was slowly increased to 10 to 120° C. then polymerized for 18 hours. After completion of polymerization, mold was taken out from the oven, and released to obtain a resin. The obtained resin was additionally annealed at 120° C. for three hours. The obtained resin was colorless, high transparency and good quality. Further it has 1.600 of Refractive index (ne), 41 of Abbe number (ve), 119.1° C. of heat resistance (Tg), 1.27 of specific gravity, and 180N/mm$^2$ of resin strength I (3 point flexural strength), 102N/mm$^2$ of resin strength II (tensile strength). The tintability was measured as ○ (transmittance of at most 30%).

Examples 2 to 5

The lenses of Examples 2 to 5 were prepared in the same way as example 1, using the components shown in Table 1-1 The evaluation results are shown in Table 2.

Comparative Example 1

To 50.6 g of 2,5-bis(isocyanatomethyl)bicyclo[2.2.1]heptane, 0.02 g of dibutyltin dichloride as a curing catalyst, 0.13 g of Zelec UN (acidic phosphoric ester), and 0.05 g of Viosorb 583 (ultraviolet absorbent) were mixed and dissolved at 20° C. By adding 23.9 g of pentaerythritol tetrakis(3-mercaptopropionate) and 25.5 g of 4-mercaptomethyl-1,8-dimercapto-3,6-dithiaoctane, mixed homogeneous solution was prepared. This homogeneous solution was degassed under the 600 Pa for 1 hour. After that the solution was filtered through 1 μm PTFE filter. Then the resulting solution was introduced to a mold equipped with glass mold and tape. This mold was put into the oven, and the temperature was slowly increased to 10 to 120° C. then polymerized for 18 hours. After completion of polymerization, mold was taken out from the oven, and released to obtain a resin. The resin obtained was additionally annealed at 120° C. for three hours. The obtained resin was colorless, high transparency, and good quality. Further it has 1.5975 of Refractive index (ne), 41 of Abbe number (ve), 121.9° C. heat resistance (Tg), 1.29 of specific gravity, and 168 N/mm² of resin strength I (3 point flexural strength), 92N/mm² of resin strength II (tensile strength). The tintability was measured as ○ (transmittance of at most 30%).

Comparative Examples 2 to 4

The lenses of Comparative Examples 2 to 4 were prepared in the same way as Comparative Example 1 using the components shown in Table 1-2. The evaluations are shown in Table 2.

The Symbol E, F, G, H of [Table 1-1] and [Table 1-2] represent as follows:

E: The alicyclic isocyanate compound. Number represents the mole number of the isocyanate group.

F: The polythiol compound having at least two thiol groups in one molecule and/or a polythiol compound having at least two thiol groups and at least one (poly)sulfide bond other than the thiol group in one molecule. Number represents the mole number of the thiol group.

G: The polyhydroxy compound having at least two hydroxy groups in one molecule and/or the (poly)hydroxy(poly)mercapto compound having at least one hydroxy group and at least one thiol group. Number represents the mole number of the thiol group, and parenthetic number represents the mole number of the hydroxy group.

H: If the mole number of hydroxy group and thiol group of the polyhydroxy compound having at least two hydroxy groups in one molecule and/or the (poly)hydroxy(poly)mercapto compound having at least one hydroxy group and at least one thiol group in one molecule, are A and B respectively, and the mole number of the thiol group of the polythiol compound having at least two thiol group and/or the polythiol compound having at least two thiol groups and at least one (poly)sulfide bond other than the thiol group in one molecule, is C, the rate (%) of the mole number of hydroxy group to the sum of the mole number of thiol group and the hydroxy group: 100×A/(A+B+C).

TABLE 1-1

|  | E | F | G | H |
|---|---|---|---|---|
| Example 1 | 2,5-bis(isocyanatomethyl)-bicyclo[2.2.1]heptane 0.603 | 4-mercaptomethyl-1,8-dimercapto-3,6-dithiaoctane 0.298 | 2-mercaptoethanol 0.152 (0.152) | 25.2 |
| Example 2 | 2,5-bis(isocyanatomethyl)-bicyclo[2.2.1]heptane 1.000 | 4-mercaptomethyl-1,8-dimercapto-3,6-dithiaoctane 0.800 | 3-mercapto-1,2-propanediol 0.067 (0.133) | 13.3 |
| Example 3 | 2,5-bis(isocyanatomethyl)-bicyclo[2.2.1]heptane 1.000 | 4-mercaptomethyl-1,8-dimercapto-3,6-dithiaoctane 0.800 | pyrogallol (0.2) | 20.0 |
| Example 4 | 2,5-bis(isocyanatomethyl)-bicyclo[2.2.1]heptane 1.000 | 4-mercaptomethyl-1,8-dimercapto-3,6-dithiaoctane 0.800 | Glycerine 1,3-bis(3-mercaptopropionate) 0.133 (0.067) | 6.7 |
| Example 5 | 2,5-bis(isocyanatomethyl)-bicyclo[2.2.1]heptane 1.000 | 4-mercaptomethyl-1,8-dimercapto-3,6-dithiaoctane 0.800 | bis(3-mercapto-propionate)malate 0.133 (0.067) | 6.7 |

TABLE 1-2

|  | E | F | G | H |
|---|---|---|---|---|
| Com. Example 1 | 2,5-bis(isocyanatomethyl)-bicyclo[2.2.1]heptane 1.000 | Pentaerythritoltetrakis(3-mercaptopropionate) 0.196 4-mercaptomethyl-1,8-dimercapto-3.6-dithiaoctane 0.804 | None 0 (0.0) | 0.0 |
| Com. Example 2 | 2,5-bis(isocyanatomethyl)-bicyclo[2.2.1]heptane 1.000 | tetrakis(2-mercaptoethylthiomethyl)-methane 1.000 | None 0 (0.0) | 0.0 |
| Com. Example 3 | 2,5-bis(isocyanatomethyl)-bicyclo[2.2.1]heptane 1.000 | Pentaerythritoltetrakis(3-mercaptopropionate) 1.000 | None 0 (0.0) | 0.0 |
| Com. Example 4 | 2,5-bis(isocyanatomethyl)-bicyclo[2.2.1]heptane 1.000 | 4-mercaptomethyl-1,8-dimercapto-3.6-dithiaoctane 1.000 | None 0 (0.0) | 0.0 |

TABLE 2

| | Refractive Index ne | Abbe Number ve | Heat Resistance (°C.) | Resin Strength I (N/mm²) | Specific Gravity | Tintability |
|---|---|---|---|---|---|---|
| Example 1 | 1.600 | 41 | 119 | 180 | 1.27 | ○ |
| Example 2 | 1.610 | 40 | 123 | 195 | 1.29 | ○ |
| Example 3 | 1.613 | 39 | 123 | 198 | 1.30 | ○ |
| Example 4 | 1.609 | 40 | 122 | 180 | 1.29 | ○ |
| Example 5 | 1.608 | 41 | 118 | 181 | 1.31 | ○ |
| Com. Example 1 | 1.600 | 41 | 122 | 168 | 1.29 | ○ |
| Com. Example 2 | 1.620 | 42 | 120 | 144 | 1.30 | Δ |
| Com. Example 3 | 1.568 | 45 | 111 | 144 | 1.30 | ○ |
| Com. Example 4 | 1.620 | 39 | 109 | 148 | 1.30 | Δ |

INDUSTRIAL APPLICABILITY

According to the present invention, transparent curing resin having excellent balance of heat resistance, specific gravity, and resin strength, and further having excellent tintability is obtained as an optical material of super high refractive index field. Especially, the present invention contributes to provide a material suitable for spectacle lens field.

The invention claimed is:

1. A polymerizable composition comprising an alicyclic isocyanate compound represented by the formula (3)

(3)

(a) at least one compound of a polythiol compound having at least two thiol groups in one molecule and/or a polythiol compound having at least two thiol groups and at least one (poly)sulfide bond other than the thiol group in one molecule which is 4-mercaptomethyl-1,8-dimercapto-3,6-dithiaoctane, and (b) at least one compound of a polyhydroxy compound having at least two hydroxy groups in one molecule and/or a (poly)hydroxy(poly)mercapto compound having at least one hydroxy group and at least one thiol group in one molecule selected from 2 mercaptoethanol, pyrogallol, glycerine 1,3-bis(3-mercaptopropionate) and bis(3-mercaptopropionate)malate and wherein, if the mole number of hydroxy group and thiol group of the polyhydroxy compound having at least two hydroxy groups in one molecule and/or the (poly)hydroxy(poly)mercapto compound having at least one hydroxy group and at least one thiol group in one molecule, are A and B respectively, and the mole number of the thiol group of the polythiol compound having at least two thiol groups and/or the polythiol compound having at least two thiol groups and at least one (poly)sulfide bond other than the thiol group in one molecule, is C, A/(A+B+C) is from 0.1 to 40% and wherein the polymerizable composition provides a resin that exhibits a greater tensile strength compared to the same resin prepared in the absence of (b).

2. The polymerizable composition according to claim 1, wherein the polyhydroxy compound having at least two hydroxy groups in one molecule and/or the (poly)hydroxy (poly)mercapto compound having at least one hydroxy group and at least one thiol group in one molecule, is 2-mercaptoethanol.

3. A process for producing a resin by curing the polymerizable composition according to claim 1.

4. A resin obtained by curing the polymerizable composition according to claim 1.

5. An optical element comprising the resin according to claim 4.

6. A lens comprising the optical element according to claim 5.

* * * * *